UNITED STATES PATENT OFFICE.

WILHELM LOMMEL, OF ELBERFELD, GERMANY, ASSIGNOR TO FARBENFABRIKEN VORM. FRIEDR. BAYER & CO., OF ELBERFELD, GERMANY, A CORPORATION OF GERMANY.

CELESTIN-BLUE SULFONIC ACID.

No. 902,154.          Specification of Letters Patent.          Patented Oct. 27, 1908.

Application filed June 23, 1908.   Serial No. 439,979.

*To all whom it may concern:*

Be it known that I, WILHELM LOMMEL, doctor of philosophy, chemist, citizen of the German Empire, residing at Elberfeld, Germany, Kingdom of Prussia, have invented new and useful Improvements in Celestin-Blue Sulfonic Acid, of which the following is a specification.

In United States Letters Patent 663221 dated December 4, 1900 it is stated that gallocyanins obtained by condensing nitrosodialkylanilins with gallic acid, ethereal gallates or gallamic acid cannot be sulfonated by the usual means, such as sulfuric acid anhydrid and the like.

I have found that celestin blue (prepared by treating gallamic acid with nitrosodiethylanilin) can easily be converted into its sulfonic acid by treating it with chlorosulfonic acid

The new free sulfonic acid having most probably the formula: $C_{17}H_{16}N_3O_4.SO_3H$ is a dark powder soluble in water and soluble in sulfuric acid with a blue color. It is soluble in dilute hydrochloric acid with a red color and soluble in acetic acid with a pure blue color.

In order to illustrate the new process more fully the following example is given, the parts being by weight: 25 parts of celestin blue are introduced into 100 parts of chlorosulfonic acid during stirring and cooling. The mixture thus obtained is then heated to 90° for about 4 hours until a test portion (diluted with water) dissolves in a solution of sodium carbonate. The product of the reaction is poured into ice water to precipitate the new sulfonic acid of celestin blue which then is filtered off after some time.

The new dyestuff produces when printed with chromium compounds on cotton pure blue shades.

Having now described my invention and in what manner the same is to be performed what I claim as new and desire to secure by Letters Patent is:—

The herein-described new sulfonic acid of celestin blue of the probable formula:

which is in the free state a dark powder which dissolves in water and in sulfuric acid with a blue color; dissolves in dilute hydrochloric acid with a red color and dissolves in acetic acid with a pure blue color; and produces when printed with chromium compounds on cotton pure blue shades, substantially as described.

In testimony whereof I have hereunto set my hand in the presence of two subscribing witnesses.

WILHELM LOMMEL. [L. S.]

Witnesses:
AUGUST HELLER,
WM. WASHINGTON BRUNSWICK.